J. B. FRAWLEY.
MAGNETO ELECTRIC MACHINE.
APPLICATION FILED JAN. 31, 1912.
1,160,995.
Patented Nov. 16, 1915.
2 SHEETS—SHEET 1.
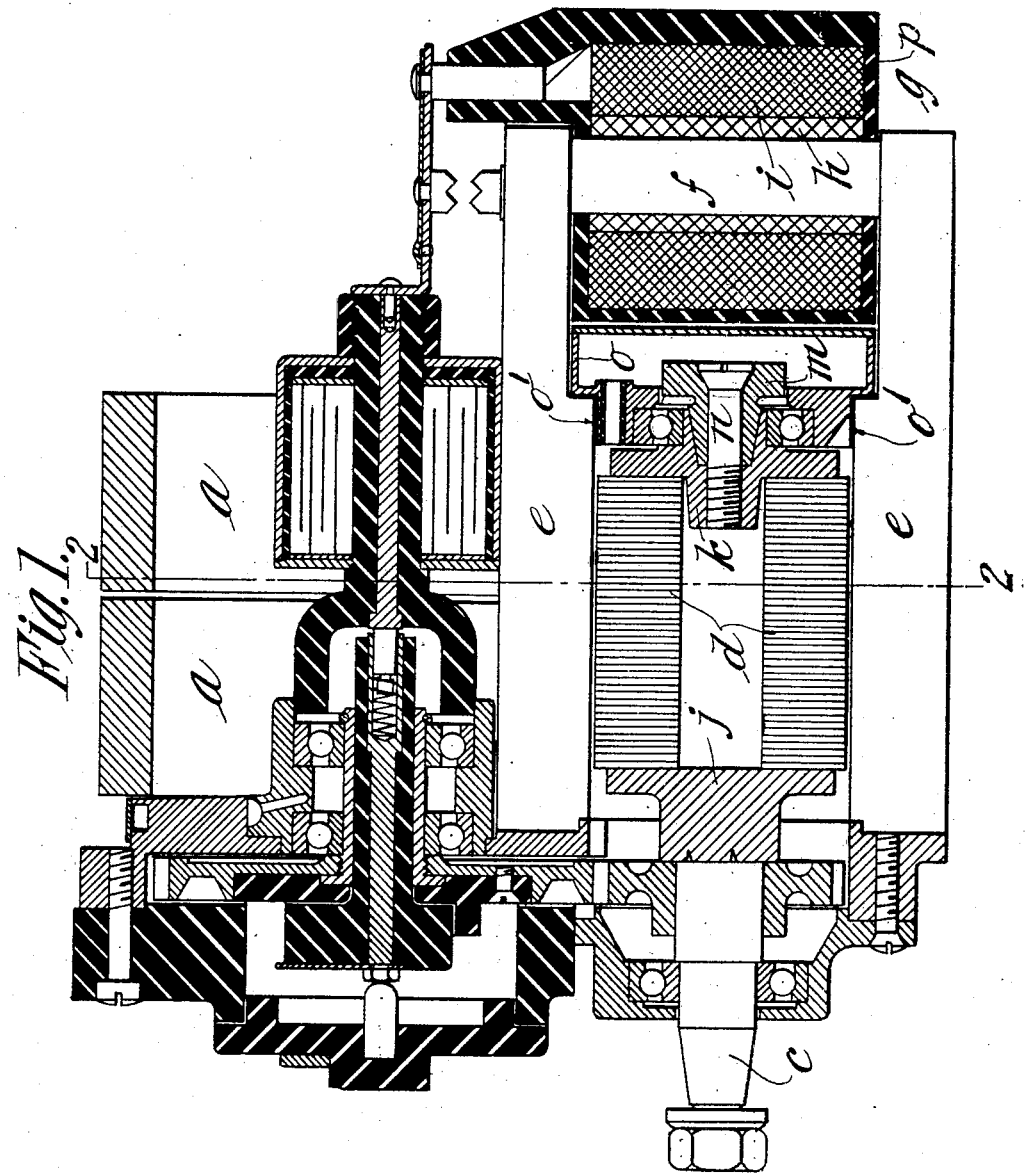
WITNESSES:
Franklin G. Neal
Harry W. Bowen
INVENTOR,
James B. Frawley,
BY Chapin Neg.
ATTORNEYS

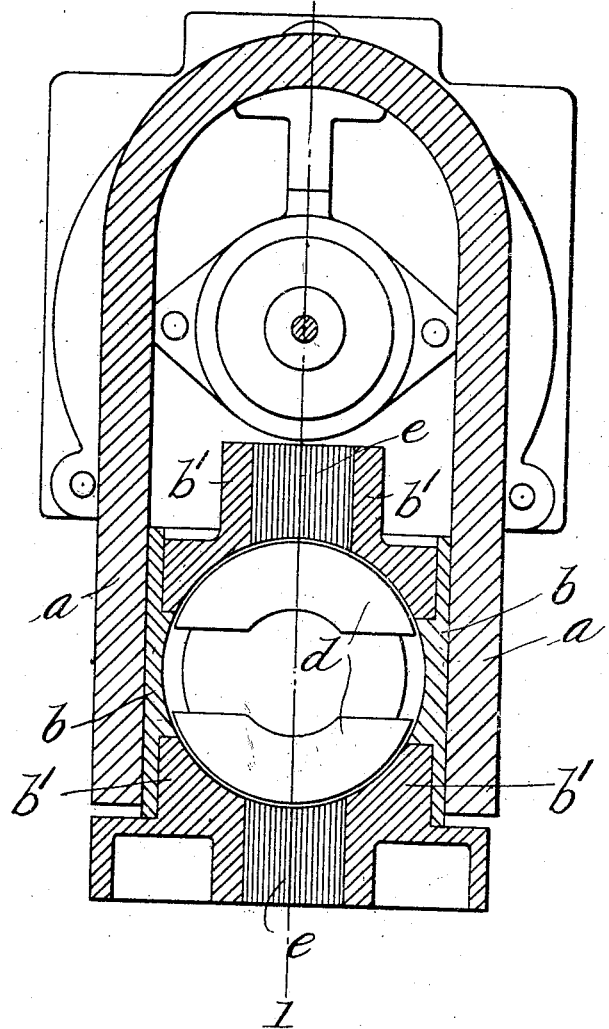

UNITED STATES PATENT OFFICE.

JAMES B. FRAWLEY, OF PITTSFIELD, MASSACHUSETTS, ASSIGNOR TO PITTSFIELD SPARK COIL COMPANY, OF PITTSFIELD, MASSACHUSETTS, A CORPORATION OF MASSACHUSETTS.

MAGNETO-ELECTRIC MACHINE.

1,160,995.  Specification of Letters Patent.  Patented Nov. 16, 1915.

Application filed January 31, 1912. Serial No. 674,520.

*To all whom it may concern:*

Be it known that I, JAMES B. FRAWLEY, a citizen of the United States of America, residing at Pittsfield, in the county of Berkshire and State of Massachusetts, have invented new and useful Improvements in Magneto-Electric Machines, of which the following is a specification.

This invention relates to improvements in magneto electric machines for ignition purposes of the type shown in the United States Letters Patent issued to Theodor M. Mueller on December 21, 1909, numbered 943,697 and on May 24, 1910, numbered 958,754, in which a movable sleeve member is interposed between the pole-pieces of the permanent magnets and the soft iron laminated core-pieces which stand in a plane at right angles to the plane of the soft iron pole-pieces. The present invention has for its object to dispense with this movable sleeve member, whereby the efficiency of the machine is materially increased.

A further object of the invention is to lessen the demagnetizing effect of eddy currents which are produced in the non-magnetic members that support the laminated core-pieces.

In magnetos of the type shown in the above referred to patents, particularly patent numbered 943,697 December 21, 1909, (in which the sleeve member is adjustable) the occurrence of the spark may be varied; or, in other words the spark may be advanced or retarded with relation to the angular position of the shaft.

It is sometimes desirable to use ignition machines in which the occurrence of the spark, with relation to the angular position of the inductor, is or may be always fixed. In order to accomplish this object, it is found that the sleeve member may be entirely omitted without destroying the efficiency of the machine. In practice, however, it is discovered that the efficiency is materially increased over the structures shown in the above mentioned patents. The removal of this sleeve member therefore causes the machine to produce a spark at practically the same angular position of the rotatable inductor element, and at the same time lessen the cost of construction and increase its efficiency.

In order to accomplish the objects above set forth, I have discovered that by electrically insulating the interrupter box or casing from the core-pieces, the pole-pieces, and the holders of the pole-pieces, that the flow of eddy currents which are generated in the casing or interrupter box is prevented, and thereby greatly increasing the out-put or efficiency of the machine as will be fully set forth.

In the drawings forming part of this application,—Figure 1 is a longitudinal, sectional view of the magneto on the line 1—1, of Fig. 2, taken through the axis of the inductor shaft, clearly showing the machine with the movable sleeve member omitted, and the electrical insulation element located between the interrupter casing and the core-pieces. Fig. 2 is a transverse sectional view on the line 2—2 of Fig. 1 showing the arrangement of the poles of the permanent magnets and those of the soft iron laminated core-pieces; also the rotating inductor member carried by the shaft.

Referring to the drawings, in detail, *a* designates the permanent field magnets having the soft iron pole or face pieces *b*, and *b'* pieces of brass to support the laminated core-pieces *e*.

*c* designates a shaft upon which are secured the soft iron arc-shaped inductor members *d*. The laminated core-pieces are arranged at 90° from the pole-pieces *b*. The former pieces extend parallel with the shaft *c*, as shown in Fig. 1 and as in the above referred to patents, their outer ends are connected by the core *f* of the induction coil which is designated as a whole by the letter *g*,—the primary and secondary windings of which are shown at *h* and *i*.

The electrical connections to the two windings of the inductor coils are not shown as they do not form any part of the present invention.

The arc-shaped inductor members *d* are rigidly clamped between the disk pieces *j* and *k*, necessarily composed of some non-inductive material, as brass or bronze.

*m* indicates a cam element through which passes a screw *n* for attaching the same to the rotating shaft.

Suitable timing devices may be employed in connection with the usual make and break mechanism which are operated by the cam *m* whereby the occurrence of the spark in the secondary may be advanced or retarded.

The induction coil *g* is axially spaced from the soft iron arc-shaped inductor members *d* by means of the interrupter casing. This casing is electrically insulated from the pole-pieces *b* and its holders *b'* by means of the insulation shown at *o'*. The object and purpose of the insulation *o'* is to prevent the flow of electric currents in the pole-pieces *b*, and its holder *b'* due to the potential of the eddy currents generated in the casing or breaker box *o*. It is clear that when the laminated inductor members *d* are rotated, the casing or breaker box *o* will be subjected to an alternating magnetic flux from one core member *e* to the other. This alternating flux will generate eddy currents in the metal casing box *o* and, if the box is not insulated from the pole-pieces *b* and their holders *b'* they will flow through these parts with a result that a magnetic field, due to these currents, will be set up which will oppose the flow of the magnetic flux in the core-pieces *e*, or, in other words by the use of the insulation *o'*, eddy currents will not be permitted to flow from the casing *o* through the pole pieces *b* and their holders *b'* which currents would set up a counter magnetic field that would oppose the flux in the core-pieces *e* and thus lessen the efficiency of the machine. The flux path for the magnetic lines of force will, therefore, be largely confined to the parts *d*, *e* and *f*, the flux flowing in alternate directions, as the arc-shaped members *d* are rotated in succession past the north and south poles of the magnet *a*: Also the pieces *b'* are maintained in a cooler condition as eddy currents can not circulate through the pieces of insulation *o'*. This construction produces an increased efficiency over the construction shown in the above mentioned patents wherein the adjustable sleeve is used, as it cuts down the air gaps and also reduces the losses caused by eddy currents in the masses of iron composing the adjustable sleeve.

The means for distributing and delivering the secondary current to the spark plugs by the magneto forms no part of my invention and the description of the same is not therefore included.

In the operation of the machine, when the shaft *a* is rotated, the soft iron members *d* pass in succession past the members *b* and *e* and serve as a means to alternately convey the magnetic flux from the poles of the permanent magnets *a* to the core-pieces *e* in the manner fully described in the above referred to patents, with the result that a spark current is induced in the secondary winding *i* when the primary is opened by the timer in the usual manner.

It will be noticed that the soft iron arc-shaped members *d* serve to directly convey the magnetic flux from the permanent magnets *a* to the poles *e* without the intervention of the adjustable sleeve member in the above referred to patents, with the result that the spark is always produced at the same time in the secondary or spark circuit corresponding to the same angular position of the shaft each time a spark is produced; or, in other words, the spark is a fixed one and not an adjustable one, as in the above referred to patents; but of course, a suitable timing device may be employed to advance or retard the spark, if desirable. The projecting outer ends of the pole-pieces *e* serve to receive the induction coil *g* which is made removable for repairs or break downs. This construction limits and confines the magnetic flux field to this portion of the machine that is spaced away from the permanent magnets and also serves to increase the efficiency of the machine.

What I claim is:—

1. A magneto-electric machine of the inductor alternator type, in combination, a field magnet, a pair of core-pieces, non-magnetic means to support the same, inductor members to convey the magnetic flux from the field magnet to the core-pieces, said core-pieces having projecting ends, an induction coil located between said ends, a timer casing device located between the core-pieces, means to electrically insulate the timer casing from the core-pieces, whereby the eddy currents that may be generated in the timer casing will be prevented from flowing in a closed electric circuit through the core pieces and oppose the flow of flux from the permanent field through the core-pieces, as described.

2. A magneto electric machine of the type described, in combination, permanent magnets to produce a constant field, core-pieces to receive the flux from the permanent magnets, an induction coil arranged between the ends of the core-pieces, inductor means to directly and alternately convey the flux from the constant field to the core-pieces, a timer casing located between the core-pieces, means to confine the eddy currents that are generated in the timer casing to the same, whereby the demagnetizing effects due to eddy currents in the timer casing is prevented.

3. The combination, in a magneto electric machine, of a rotatable inductor member, permanent magnets, pole-pieces secured thereto, core-pieces angularly spaced from the pole-pieces, holders therefor, an induction coil having its core located between the ends of the core-pieces, an interrupter or circuit breaker casing located between the core-pieces, means for insulating said casing whereby the eddy currents that are generated in said casing may be confined thereto, as described, and the magnetic flux in the core-pieces is maintained at a constant value.

JAMES B. FRAWLEY.

Witnesses:
HARRY W. BOWEN,
FRANKLIN G. NEAL.